(12) United States Patent
Wakiyama et al.

(10) Patent No.: US 7,835,835 B2
(45) Date of Patent: Nov. 16, 2010

(54) VEHICLE CLIMATE CONTROL APPARATUS AND METHOD

(75) Inventors: Kenichi Wakiyama, Kariya (JP); Takeshi Kawashima, Nisshin (JP)

(73) Assignee: Denso Corporation, Kariya (JP)

(*) Notice: Subject to any disclaimer, the term of this patent is extended or adjusted under 35 U.S.C. 154(b) by 119 days.

(21) Appl. No.: 12/319,961

(22) Filed: Jan. 14, 2009

(65) Prior Publication Data
US 2009/0138155 A1 May 28, 2009

Related U.S. Application Data

(62) Division of application No. 11/434,422, filed on May 15, 2006, now abandoned.

(30) Foreign Application Priority Data
May 16, 2005 (JP) .............................. 2005-143042

(51) Int. Cl.
*B61D 27/00* (2006.01)
(52) U.S. Cl. ........................................................ 701/36
(58) Field of Classification Search .................... 701/36
See application file for complete search history.

(56) References Cited

U.S. PATENT DOCUMENTS

| | | | | |
|---|---|---|---|---|
| 5,924,406 | A * | 7/1999 | Kinugasa et al. | 123/436 |
| 6,226,073 | B1 * | 5/2001 | Emoto | 355/53 |
| 2001/0001248 | A1 * | 5/2001 | Emoto | 355/53 |
| 2001/0005991 | A1 * | 7/2001 | Niimi et al. | 62/133 |
| 2001/0008131 | A1 * | 7/2001 | Ota et al. | 123/339.17 |
| 2002/0157414 | A1 * | 10/2002 | Iwanami et al. | 62/239 |
| 2003/0070800 | A1 * | 4/2003 | Ito et al. | 165/271 |
| 2006/0259219 | A1 * | 11/2006 | Wakiyama et al. | 701/36 |

FOREIGN PATENT DOCUMENTS

| | | |
|---|---|---|
| EP | 1302344 A2 * | 4/2003 |
| JP | 02274610 A * | 11/1990 |
| JP | 2003-285618 | 10/2003 |
| JP | 2003-335128 | 11/2003 |
| JP | 2004-146144 | 5/2004 |
| JP | 2004-248455 | 9/2004 |

OTHER PUBLICATIONS

Office action dated Jul. 13, 2010 in corresponding Japanese Application No. 2006-132266.

* cited by examiner

*Primary Examiner*—Thomas G Black
*Assistant Examiner*—Shelley Chen
(74) *Attorney, Agent, or Firm*—Harness, Dickey & Pierce, PLC

(57) ABSTRACT

A vehicle climate control apparatus and method realizing a satisfactory drive feeling and in-compartment comfort, at the same time, by estimating the behavioral intention of the driver at an early time are disclosed. The vehicle climate control apparatus comprises an air-conditioning control unit for controlling the air-conditioning state in the compartments by controlling the air-conditioning device, a driving behavior detection unit for detecting the operation amounts of the driver, an estimation unit for calculating the behavioral intention estimating information for estimating the prospective driving behavior of the driver based on the operation amounts detected by the driving behavior detection unit, and a determining unit for estimating the output state of the power source based on the behavioral intention estimating information and giving an instruction to the air-conditioning control unit in accordance with the estimated output state.

9 Claims, 14 Drawing Sheets

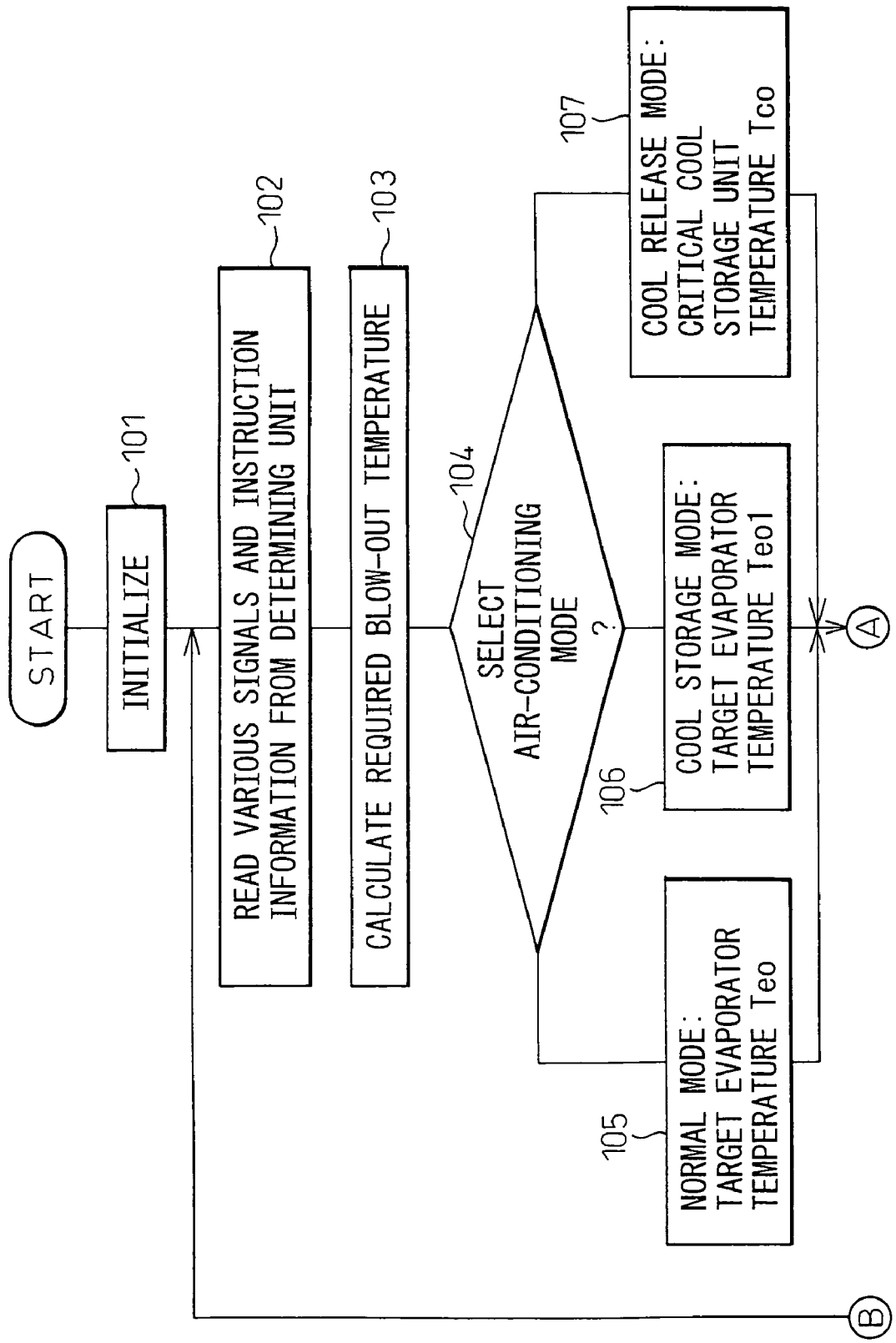

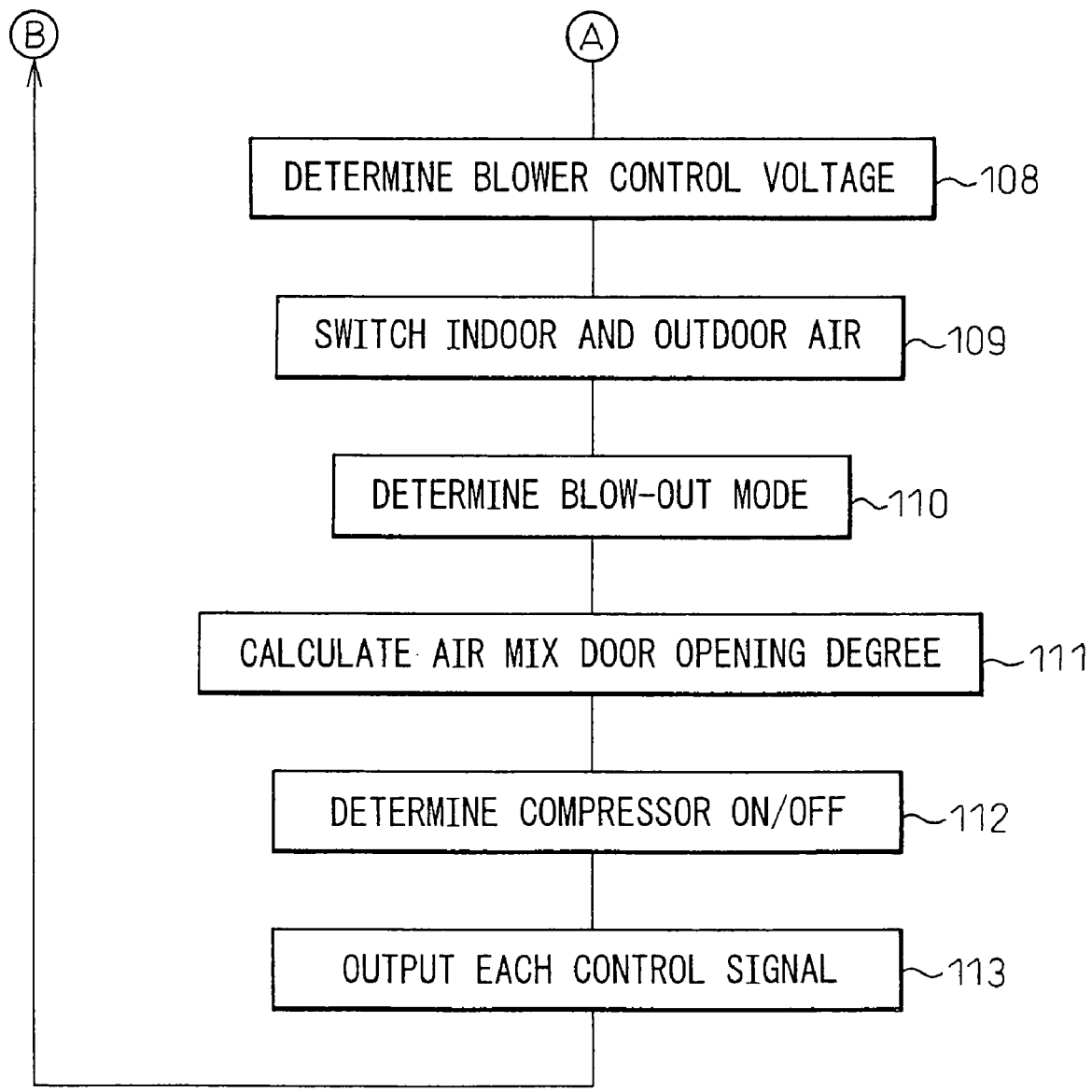

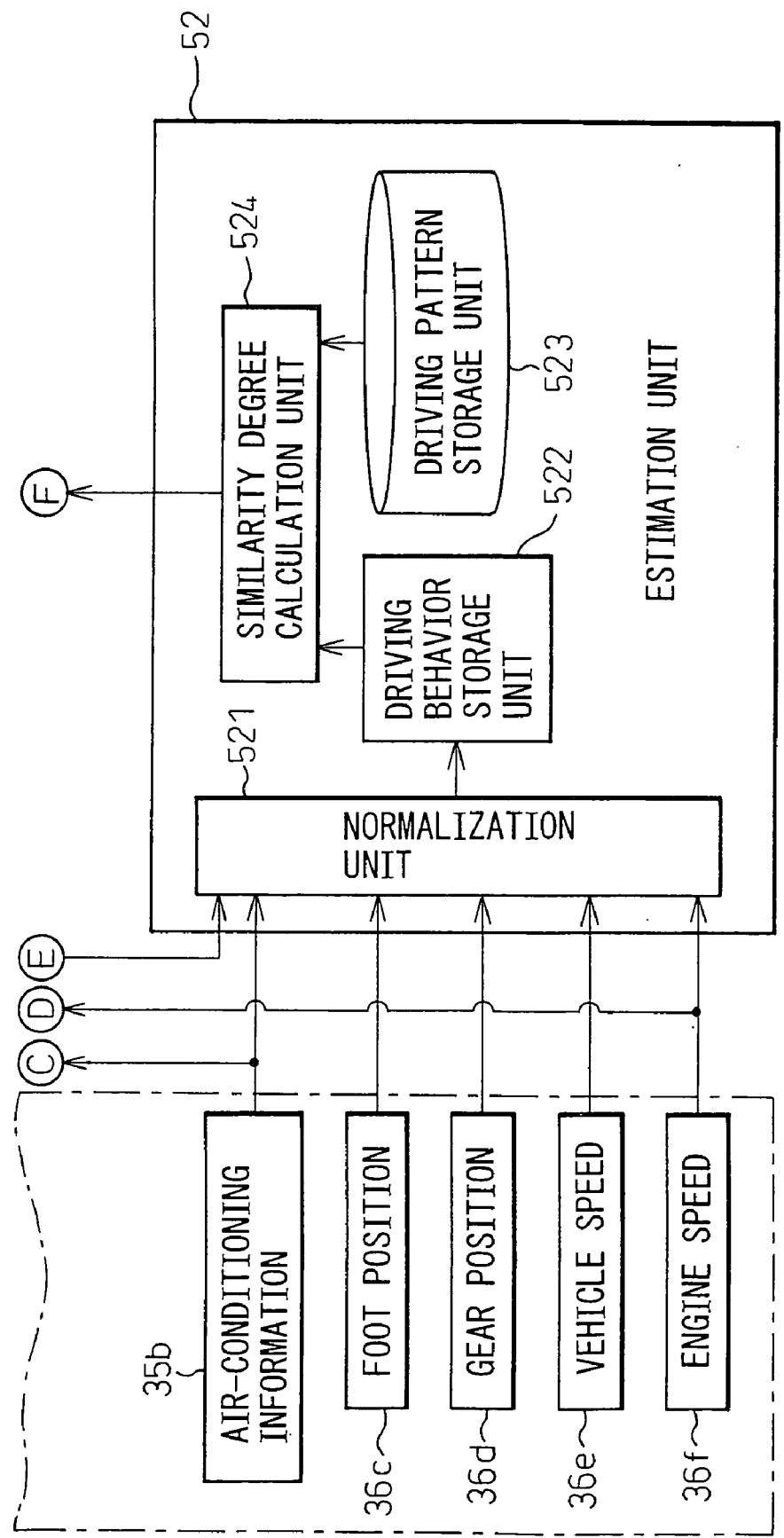

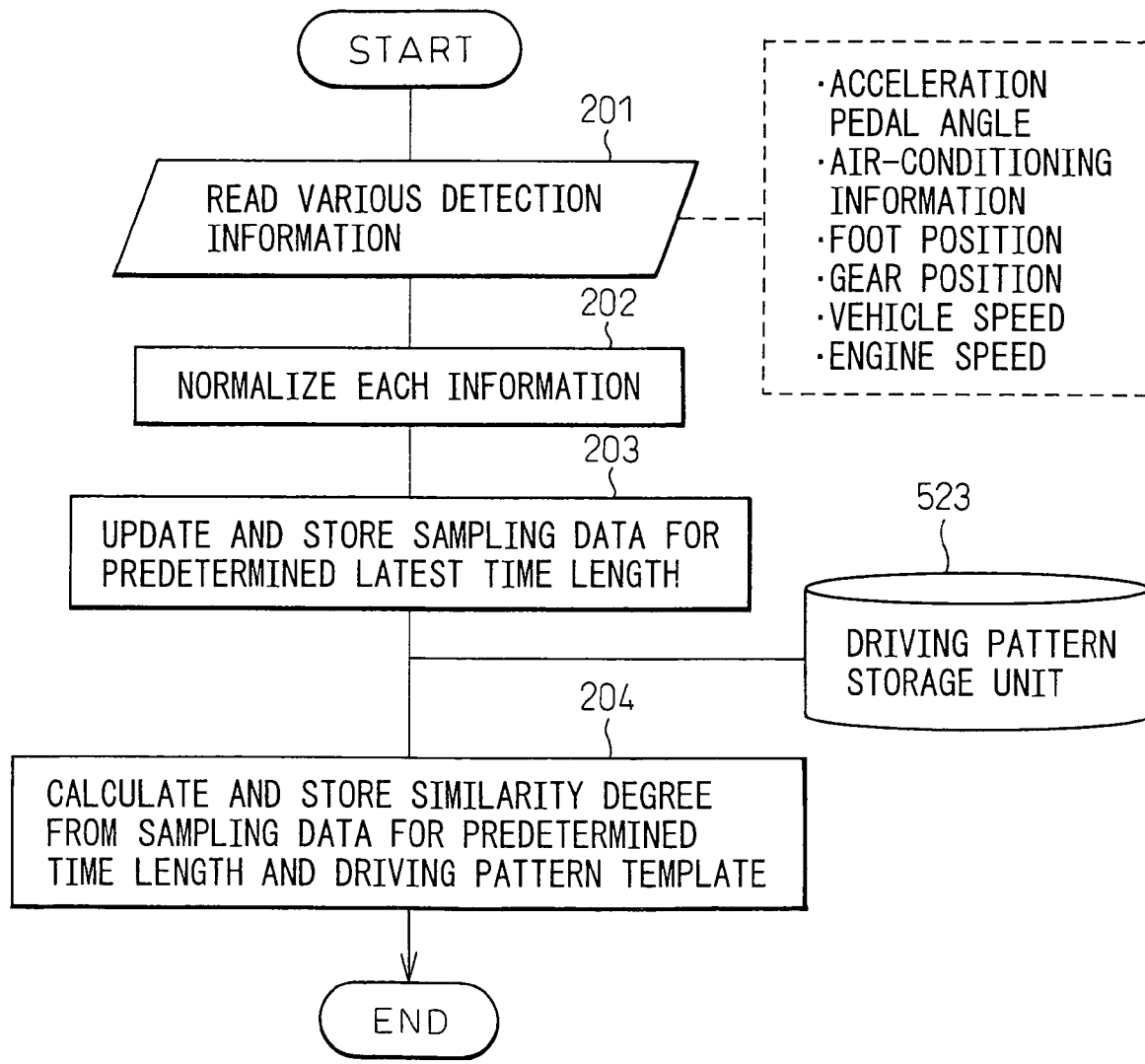

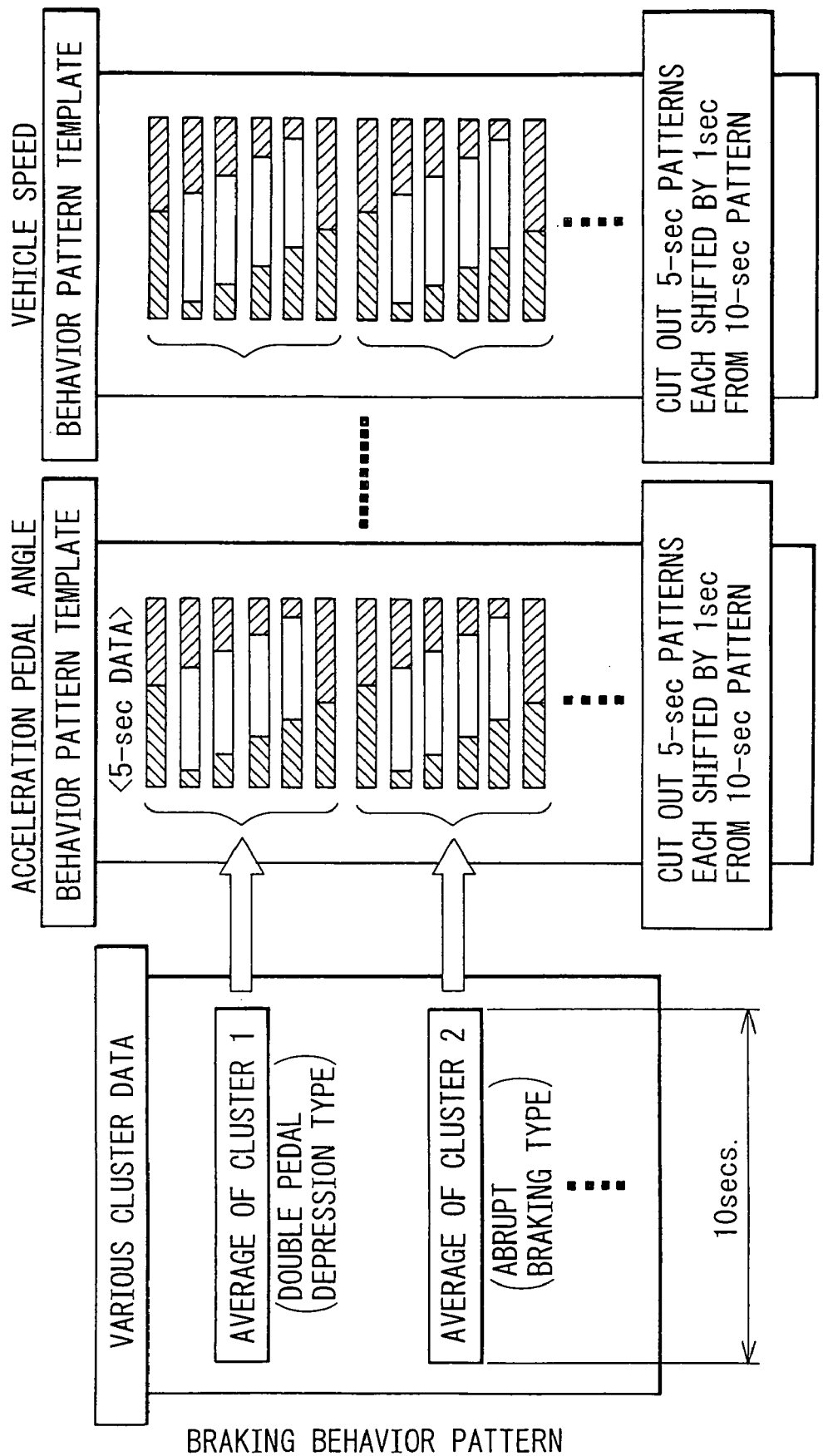

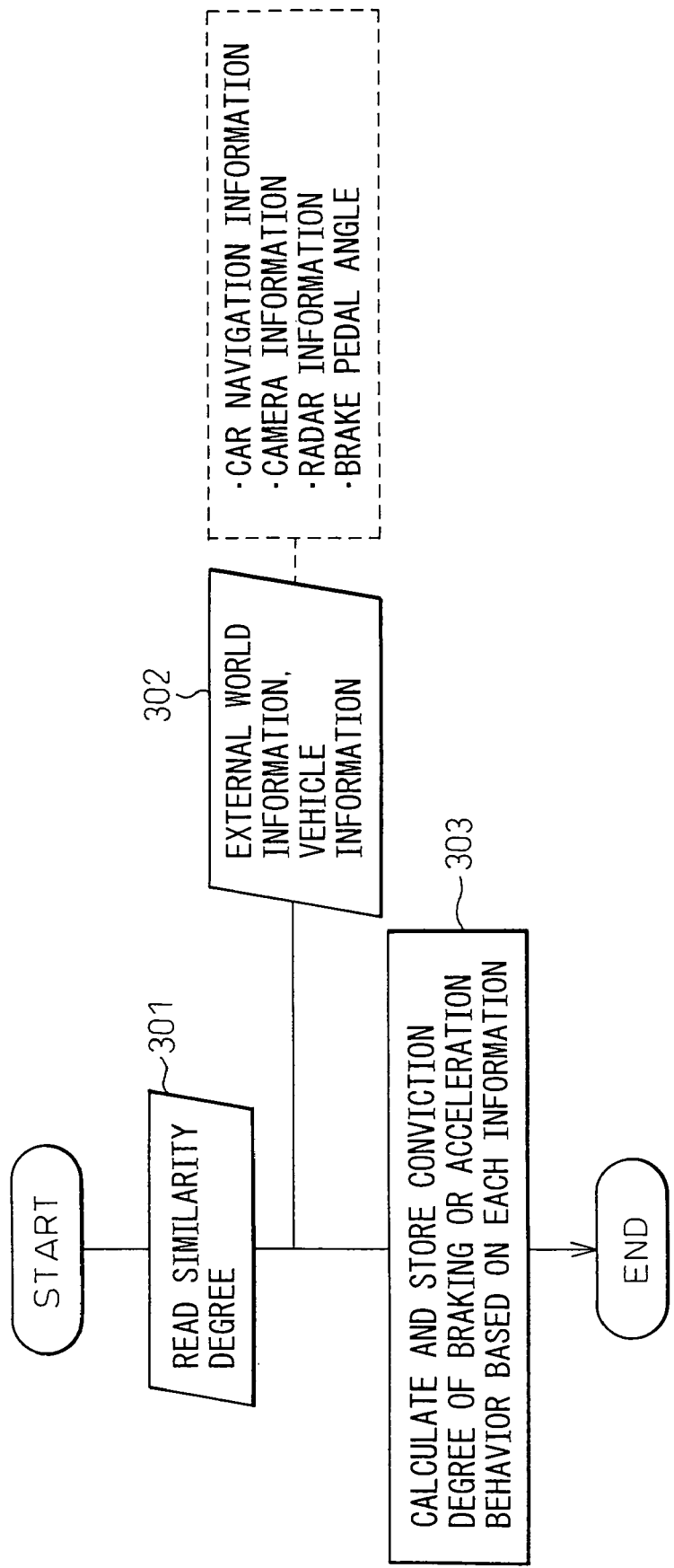

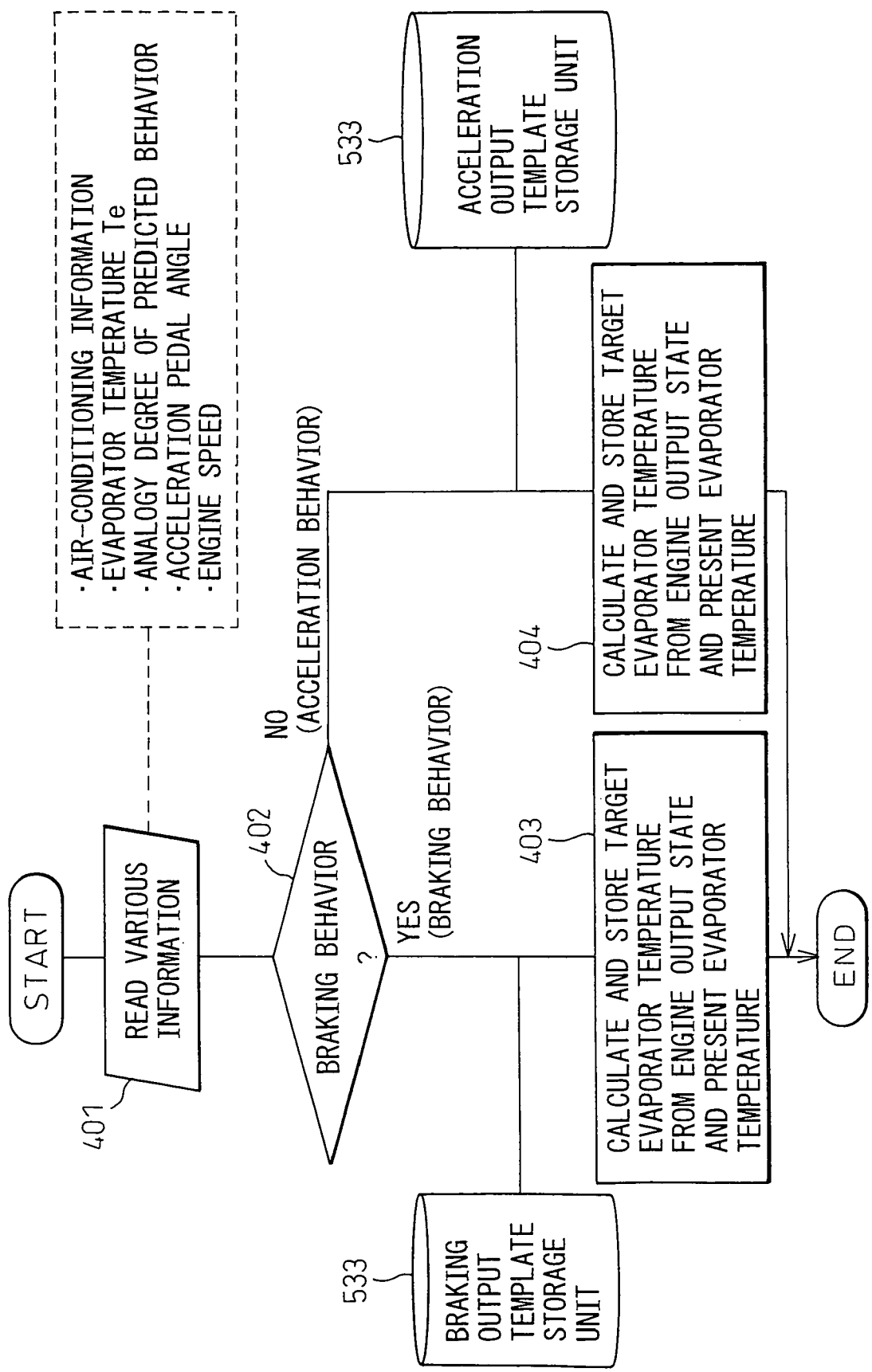

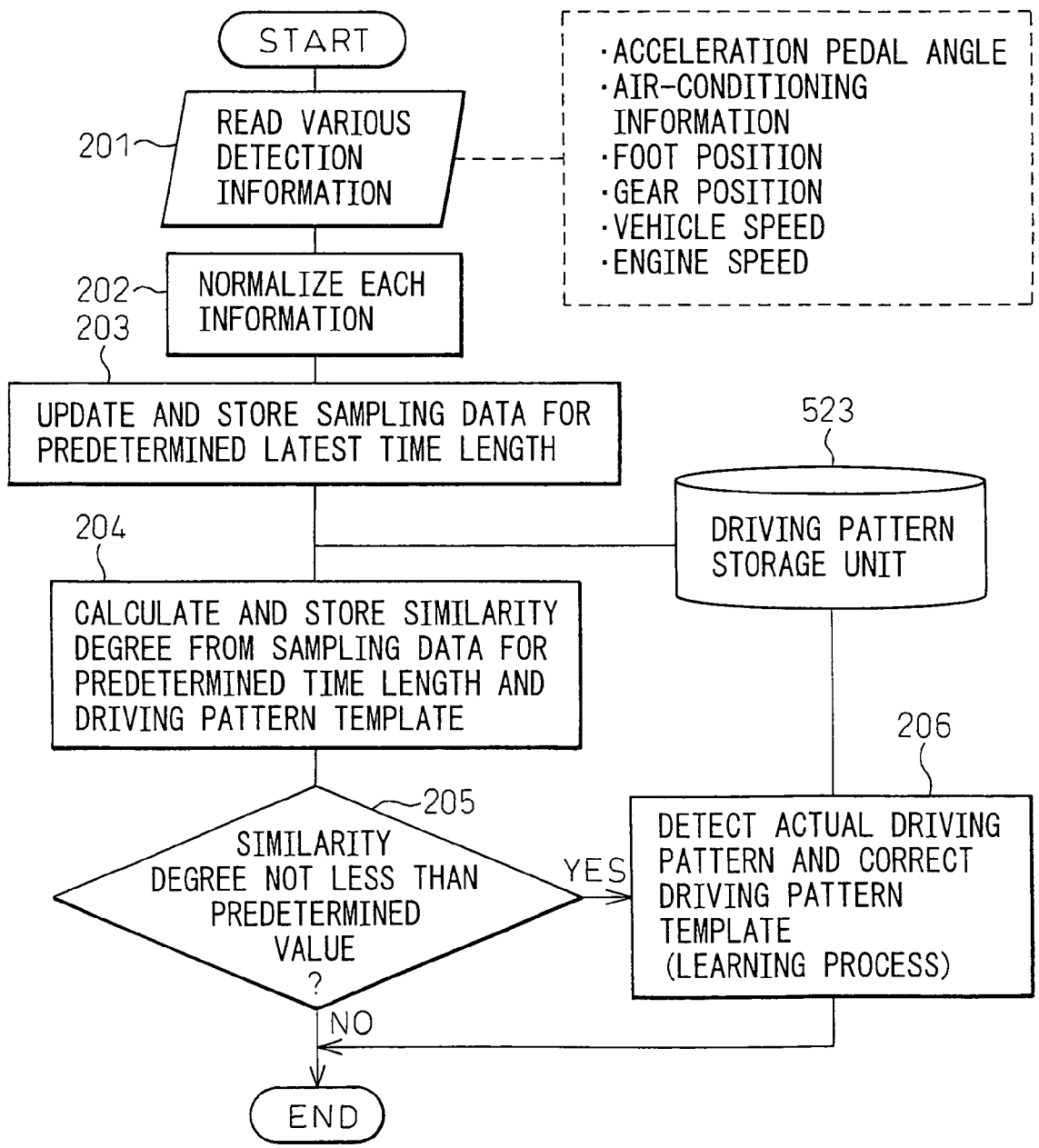

VEHICLE CLIMATE CONTROL APPARATUS AND METHOD

CROSS-REFERENCE TO RELATED APPLICATIONS

This application is a Divisional of U.S. patent application Ser. No. 11/434,422 filed on May 15, 2006. This application claims the benefit and priority of JP 2005-143042, filed May 16, 2005. The entire disclosures of each of the above applications are incorporated herein by reference.

BACKGROUND OF THE INVENTION

1. Field of the Invention

This invention relates to a vehicle climate control apparatus and an air-conditioning control method capable of adjusting the air-conditioning state by estimating the intention of the driver from his driving behavior at an early time.

2. Description of the Related Art

In the prior art, a technique is known to secure the engine acceleration characteristic by reducing the load of an air-conditioning compressor on the vehicle engine (Japanese Unexamined Patent Publication No. 2003-285618, for example). In the vehicle climate control apparatus described in Japanese Unexamined Patent Publication No. 2003-285618, an acceleration is determined and the compressor is stopped or the compressor capacity is reduced in the case where the acceleration pedal angle actually exceeds a threshold value.

Also in the case where the engine load is increased such as when ascending a slope or at a merging point, the compressor load of the climate control apparatus is imposed directly on the engine and is liable to adversely affect the drive feeling until the actual acceleration pedal angle exceeds a predetermined threshold value. This is also the case with a vehicle such as a hybrid car using the motor as a power source. Specifically, with an increase in the load on the power source, the electrical load of the electrically operated compressor of the climate control apparatus is imposed directly on the on-vehicle power supply with the result that the power supply may be overloaded. Once the on-vehicle power supply is overloaded, the motor output is reduced and the drive feeling may be adversely affected.

SUMMARY OF THE INVENTION

An object of this invention is to provide a vehicle climate control apparatus and an air-conditioning control method capable of realizing both satisfactory drive feeling, and in-compartment comfort at the same time, by estimating the intention of the driver at an early time.

Another object of the invention is to provide a climate control apparatus of a cool-storage type for storing cold thermal energy during the operation of the refrigeration cycle, and an air-conditioning method, wherein both satisfactory drive feeling and in-compartment comfort can be realized, at the same time, by controlling the operations of storing or releasing the cold thermal energy by estimating the intention of the driver at an early time.

In order to achieve the objects described above, the technical means described in each claim are employed.

According to an aspect of the invention, there is provided a vehicle climate control apparatus comprising:

an air-conditioning control unit for controlling the air-conditioning state in the vehicle compartments by controlling an air-conditioning device;

a driver behavior detection unit for detecting the operation amounts of the driver;

an estimation unit for calculating the behavioral intention estimation information representing the estimation of the prospective behavior of the driver based on the operation amounts detected by the driver behavior detection unit; and a determining unit for estimating the output state of a power source based on the behavioral intention information and giving an instruction, corresponding to the estimated output state, to the air-conditioning control unit.

According to an aspect of the invention, there is provided a vehicle climate control apparatus wherein the operation amounts preferably include at least one of the acceleration pedal angle, the vehicle speed and the engine speed. The detection of the driver operation information is thus made possible.

According to an aspect of the invention, there is provided a vehicle climate control apparatus wherein the determining unit preferably gives an instruction to the air-conditioning control unit to adjust the air-conditioning capacity in accordance with a predicted output state.

By doing so, based on the driver operation information, the intention of the prospective driving behavior of the driver (for example, accelerating operation or braking operation) can be estimated and the output state of the vehicle power source can be predicted at an early time. Depending on the predicted driving behavior (for example, an accelerating operation), the air-conditioning load on the vehicle power source can be adjusted downward to give priority to the driving behavior. Also, depending on the predicted driving behavior (for example, a decelerating operation), the air-conditioning load on the vehicle power source can be adjusted upward to give priority to the air-conditioning capacity. As a result, both a satisfactory drive feeling and in-compartment comfort can be secured at the same time.

According to an aspect of the invention, there is provided a vehicle climate control apparatus wherein the air-conditioning device includes a cool storage unit for storing the cold thermal energy using the cooling capacity during the air-conditioning operation, and the determining unit preferably instructs the air-conditioning control unit to store or release the cold thermal energy in accordance with the predicted output state.

As a result, based on the driver operation information, the intention of the driver, regarding the prospective driving behavior (for example, the accelerating behavior or the braking behavior), is predicted so that the output state of the vehicle power source can be predicted and an instruction to store the cold thermal energy in the cool storage unit or release the cold thermal energy from the cool storage unit can be issued at an early time. Depending on the predicted driving behavior (for example, the accelerating behavior), therefore, the compressor load on the vehicle power source can be adjusted downward or the cold thermal energy can be released from the cool storage unit before the driver starts the predicted driving behavior, so as to accord the driving behavior priority over an air-conditioning of a car. Also, depending on the predicted driving behavior (for example, the decelerating behavior), the compressor load on the vehicle power source can be adjusted upward at an early time to give priority to storing the cold thermal energy in the cool storage unit. Thus, both a satisfactory drive feeling and in-compartment comfort can be secured at the same time.

According to an aspect of the invention, there is provided a vehicle climate control apparatus wherein the air-conditioning device includes an evaporator, and the determining unit preferably instructs the cool storage unit to store the cold thermal energy and to achieve a target evaporator temperature. Thus, the availability factor, of the compressor and the air-conditioning capacity of the air-conditioning device, can be adjusted.

According to an aspect of the invention, there is provided a vehicle climate control apparatus wherein the estimation unit preferably includes a driving behavior storage unit for storing the detection information from the driver behavior detection unit for a predetermined period of time, a driving pattern storage unit for storing a predetermined driving behavior pattern indicating the braking behavior or the accelerating behavior, and a similarity degree calculation unit for determining a similarity degree by comparing the operation amounts stored in the driving behavior storage unit with predetermined driving behavior patterns and calculating the behavioral intention estimating information based on the most analogous driving pattern.

By comparing the driving behavior of the driver for a predetermined period of time with a predetermined driving behavior pattern, the driving behavior of the driver can be predicted with a higher accuracy.

According to another aspect of the invention, there is provided a vehicle climate control apparatus comprising:

an air-conditioning control unit for controlling the air-conditioning state in the vehicle compartments by controlling an air-conditioning device;

a driver behavior detection unit for detecting the operation amounts of the driver;

an estimation unit for calculating the behavioral intention estimating information estimating the prospective behavior of the driver based on the operation amounts detected;

a vehicle motion detection unit for detecting the motion of the vehicle; and a determining unit for determining the conviction degree indicating the accuracy of the behavioral intention estimating information based on the vehicle motion information detected by the vehicle motion detection unit and instructing the air-conditioning control unit to store the cold thermal energy in the cool storage unit based on the conviction degree.

According to another aspect of the invention there is provided a vehicle climate control apparatus, wherein the determining unit preferably instructs the air-conditioning control unit to store the cold thermal energy in the cool storage unit in the case where the conviction degree exceeds a predetermined value and gives no such instruction to the air-conditioning control unit in the case where the conviction degree is not more than the predetermined value.

The driver's intention, regarding the prospective braking behavior, is estimated based on the driver operation information on the one hand, and the accuracy of the predicted braking behavior is quantitatively confirmed based on the vehicle motion information indicating the motion of the vehicle. By doing so, the prospective braking behavior of the driver can be determined with a higher accuracy.

According to another aspect of the invention, there is provided a vehicle climate control apparatus, wherein the vehicle motion information preferably includes at least one of the road information from the car navigation system for guiding the driver along the route and the road condition ahead of or behind the vehicle detected by a camera or a radar. In this way, the vehicle motion can be detected in addition to the driver operation information.

According to another aspect of the invention, there is provided a vehicle climate control apparatus, wherein the air-conditioning device has an evaporator, and the determining unit preferably instructs the cool storage unit to store the cold thermal energy so as to achieve the target evaporator temperature. Thus, the availability factor of the compressor and the air-conditioning capacity of the air-conditioning device can be adjusted.

According to another aspect of the invention, there is provided a vehicle climate control apparatus, wherein the estimation unit includes a driving behavior storage unit for storing the operation amounts for a predetermined period of time, a driving pattern storage unit for storing a predetermined driving behavior pattern indicating the accelerating behavior or the braking behavior, and a similarity degree calculation unit for determining a similarity by comparing the operation amounts stored in the driving behavior storage unit with a predetermined driving behavior pattern and calculating the behavioral intention estimating information based on the most analogous driving pattern, wherein the determining unit preferably determines the conviction degree based on the vehicle motion information, the behavioral intention estimation information and the degree of similarity.

The behavioral intention estimating information for estimating the intention of the driver for the prospective driving behavior is determined based on the driver operation information, and the conviction degree is determined based on the similarity degree and the vehicle operation information indicating the vehicle motion. In this way, the prospective driving behavior of the driver can be determined with a higher accuracy. By starting to store the cold thermal energy in the cool storage unit at an early time, a longer cool storage time is secured than in the case where the cold thermal energy is stored after actual braking or decelerating operation.

According to another aspect of the invention, there is provided a vehicle climate control apparatus, wherein the air-conditioning device includes an air-conditioning case, an evaporator arranged in the air-conditioning case for cooling the flowing air and the cool storage unit downstream of the evaporator, wherein the determining unit preferably further includes a target evaporator temperature calculation unit for determining the target evaporator temperature based on the vehicle motion information, the behavioral intention estimating information and the conviction degree, and an output determining unit for instructing the air-conditioning control unit to store the cold thermal energy in the cool storage unit so as to achieve the target temperature of the evaporator in the air-conditioning device.

As a result, by estimating the intention of the driver for the prospective driving behavior, the cold thermal energy can be stored in the cool storage unit at an early time. At the same time, by setting the prevailing target evaporator temperature, the temperature conditions desirable for storing the cold thermal energy in the cool storage unit can be set.

According to another aspect of the invention, there is provided a vehicle climate control apparatus, wherein the behavioral intention estimating information estimates the braking behavior of the driver and, in the case where the conviction degree exceeds a predetermined value, the output determining unit reduces the target evaporator temperature stepwise from a level higher than a temperature determined by the target evaporator temperature calculation unit. At the time of actual braking behavior, the target evaporator temperature is thus preferably set to the temperature determined by the target evaporator temperature calculation unit.

First, the target evaporator temperature is set to a comparatively high level and gradually reduced. In this way, the availability factor of the compressor (i.e. the compressor load on the power source) can be gradually increased. As a result, the cold thermal energy can be stored without any sense of incongruity on the part of the driver before an actual start of the braking operation.

According to another aspect of the invention, there is provided a vehicle climate control apparatus, wherein the behavioral intention estimating information estimates the accelerating behavior of the driver, and in the case where the conviction degree exceeds a predetermined value, the determining unit desirably instructs the air-conditioning control unit to store the cold thermal energy in the cool storage unit until the driver actually performs the accelerating behavior.

The intention of the driver for the prospective accelerating behavior is estimated based on the driver operation information, and the accuracy of the predicted accelerating behavior is quantitatively confirmed based on the vehicle motion information indicating the vehicle motion. As a result, the prospective accelerating behavior of the driver can be determined with a higher accuracy. The cold thermal energy can thus be stored in the cool storage unit from the time point when the accelerating behavior is predicted until the actual accelerating behavior starts.

According to another aspect of the invention, there is provided a vehicle climate control apparatus, wherein, in the case where the driver actually performs the accelerating behavior, the determining unit preferably instructs the air-conditioning control unit to release the cold thermal energy from the cool storage unit. The cold thermal energy is stored in the cool storage unit from the time point of predicting the accelerating behavior to the time point of actual accelerating behavior, while the cold thermal energy is released at the time of actual accelerating behavior. In the case where a large motive power is required, therefore, no motive power must be supplied to the compressor. Thus, a comfortable air-conditioning operation is made possible without adversely affecting the acceleration feeling.

According to this invention, there is provided a climate control method for controlling the air-conditioning device, comprising the steps of:

determining the similarity degree by comparing a predetermined driving behavior pattern with the driving behavior pattern of the driver determined based on the detection information from the driver behavior detection unit for detecting the operation amounts of the driver;

calculating the behavioral intention estimating information for estimating the prospective driving behavior of the driver based on the driving pattern highest in similarity degree;

determining the conviction degree indicating the accuracy of the behavioral intention estimating information based on the vehicle motion information from the vehicle motion detection unit for detecting the vehicle motion, the behavioral intention estimating information and the similarity degree; and controlling the air-conditioning capacity of the air-conditioning device in accordance with the vehicle motion information and the behavioral estimating information when the conviction degree is high.

The conviction degree in advance is determined based on the behavioral intention estimating information and the vehicle motion information indicating the motion of the vehicle. In this way, the intention of the driver for the prospective driving behavior (for example, the braking behavior, accelerating behavior, etc.) can be determined with higher accuracy. As a result, the air-conditioning capacity corresponding to the driving behavior can be controlled at an early time.

According to this invention, there is provided a climate control method, preferably further comprising the learning processing step for correcting a predetermined driving behavior pattern based on the actual driving behavior pattern of the driver for the similarity degree not less than a predetermined value.

A different driver has a different propensity and features unique to him/her. In view of this, the propensity and the features are learned from the actual driving pattern and reflected in the predetermined driving behavior pattern. In this way, the driving behavior pattern can be adapted to each driver more accurately for an improved accuracy of determining the driving pattern.

BRIEF DESCRIPTION OF THE DRAWINGS

FIG. 3A is a flowchart showing the main routine of the air-conditioning control process (air-conditioning control unit 54) executed by an air-conditioning device 50.

FIG. 3B is a flowchart showing the main routine of the air-conditioning control process (air-conditioning control unit 54) executed by the air-conditioning device 50.

FIG. 4A is a block diagram showing the main functions of an estimation unit 52 of the air-conditioning control device 50.

FIG. 5 is a flowchart showing the operation of the estimation unit 52.

FIG. 6 is a diagram for explaining a behavior pattern template stored in a driving pattern storage unit 523.

FIG. 7 is a flowchart showing the operation of a conviction degree calculation unit 531.

FIG. 8 is a flowchart showing the operation of a target evaporator temperature calculation unit 532.

FIG. 11 is a flowchart showing the operation of the estimation unit 52 having the learning function according to another embodiment of the invention.

DETAILED DESCRIPTION OF THE INVENTION

An embodiment of the invention is explained below.

This invention relates to a technique for securing both a satisfactory drive feeling and in-compartment comfort at the same time, in which the estimation unit for estimating the intention of the driver for the driving behavior based on various detection information is combined with the air-conditioning control unit, by adjusting the air-conditioning state by predicting the driving behavior of the driver at an early time.

Currently, the need for a climate control apparatus of a cool storage type has increased, as an air-conditioning device used for vehicles which stop the engine while waiting for a signal turn, etc. (idling stop vehicle, hybrid car, etc.), for the purpose of environment protection. The climate control apparatus of a cool storage type includes a cool storage unit for storing the cold thermal energy during the operation of the compressor and can cool the air blown into the compartments by the cool storage unit while the compressor is off. An embodiment of the invention realizing this climate control apparatus of a cool storage type in which the cold thermal energy can be effectively stored and released, while taking the drive feeling into consideration, is explained.

(General Configuration of Vehicle Climate Control Apparatus)

Figure 1:
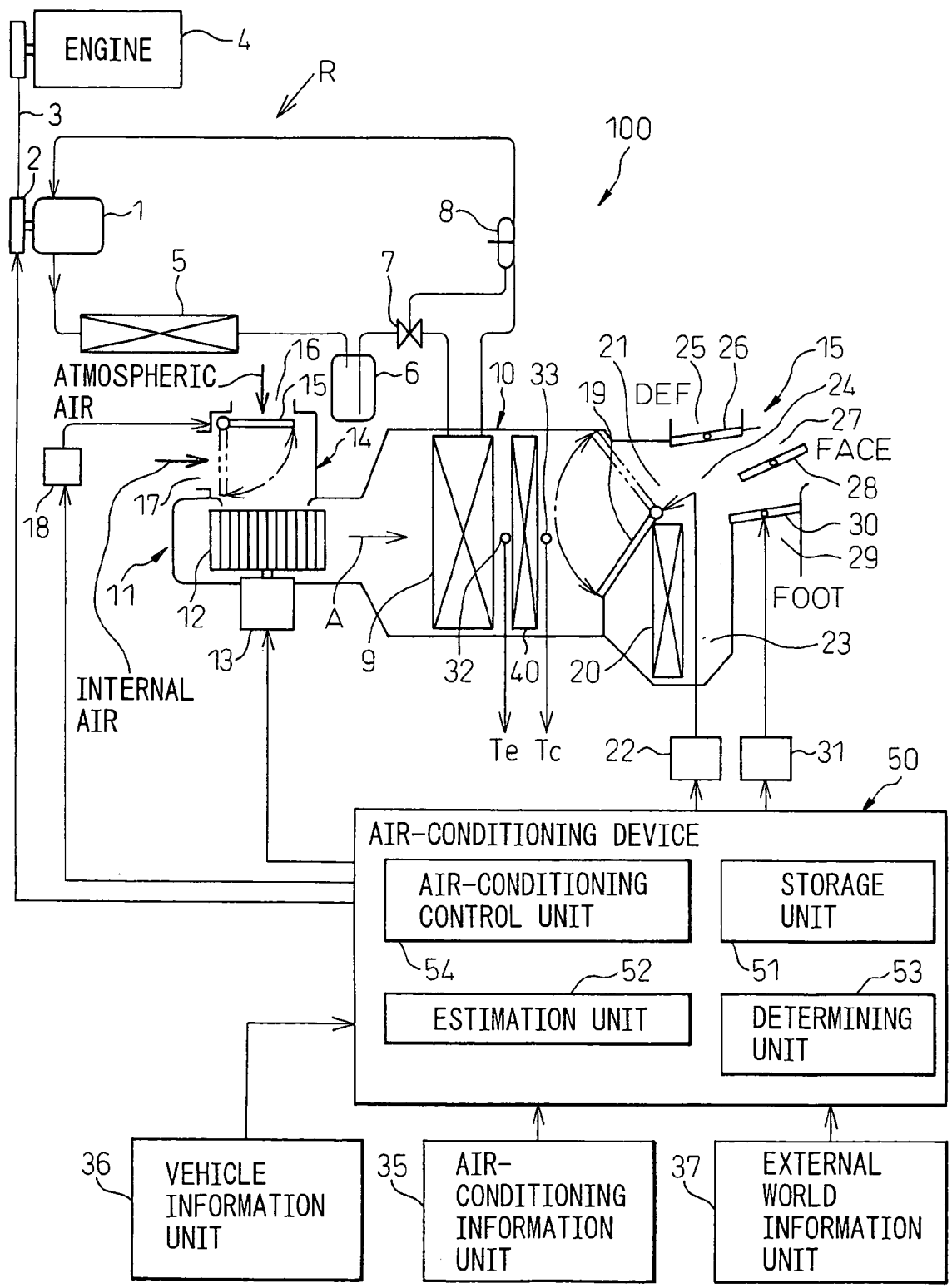
FIG. 1 is a diagram showing a general configuration of a vehicle climate control apparatus according to an embodiment of the invention.
Figure 2:
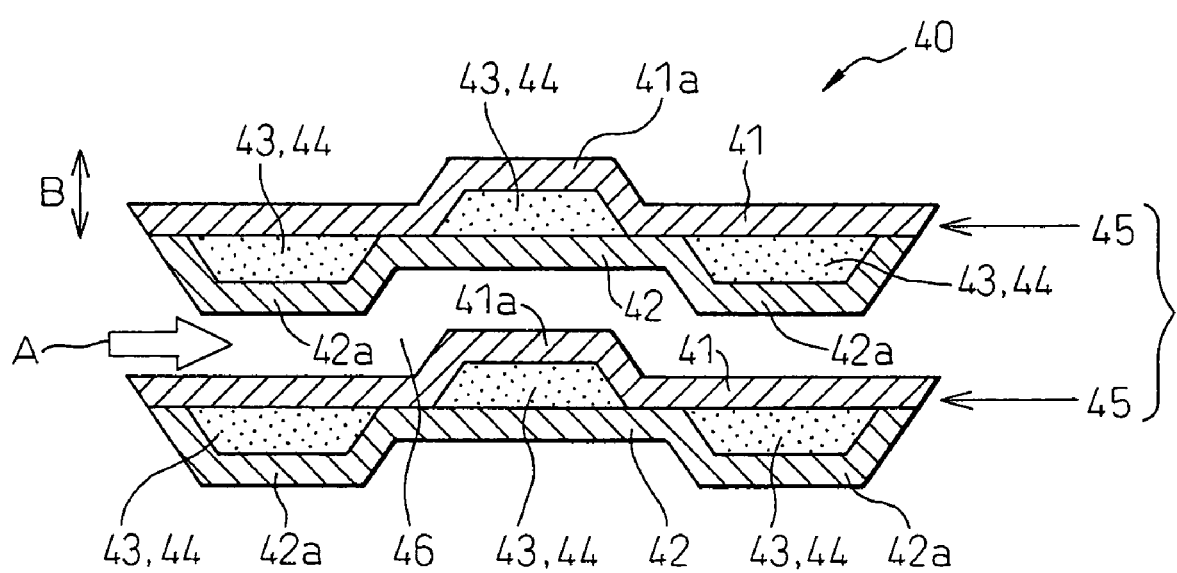
FIG. 2 is a sectional view showing the essential parts of a cool storage unit 40.

FIG. 1 shows a general configuration of a vehicle climate control apparatus, and FIG. 2 shows a sectional view of the essential parts of a cool storage unit 40.

In FIG. 1, the vehicle climate control apparatus comprises an air-conditioning device 100 mainly having a mechanical configuration and an air-conditioning control device 50 constituting a control unit of the air-conditioning device 100.

First, the configuration of the air-conditioning device 100 will be explained. The refrigeration cycle R of the air-conditioning device includes a compressor 1. The compressor 1 includes an electromagnetic clutch 2 for supplying or cutting off the motive power transmitted from an on-vehicle engine 4 through a belt 3. The refrigeration cycle R is configured of a closed circuit including, indicated counterclockwise from the compressor 1, a condenser 5, a receiver 6, a temperature-type expansion valve 7 having a temperature sensing unit 8 and an evaporator 9.

In an air-conditioning case of the air-conditioning device 100, a blower fan 11 is arranged upstream of the evaporator 9. The blower fan 11 includes a centrifugal blow fan 12 and a drive motor 13. An indoor-outdoor air switching box 14 is arranged on the intake side of the blower fan 11. The indoor-outdoor air switching box 14 has arranged therein an indoor-outdoor air switching door 15 driven by an electrical drive unit 18. The indoor-outdoor air switching door 15 is turned on/off by switching an atmospheric air intake hole 16 and an internal air intake hole 17.

A cool storage unit 40, an air mix door 19 and a heater core 20 are arranged in that order from the evaporator side downstream of the evaporator 9. Also, a bypass 21 bypassing the heater core 20 is formed. The air mix door 19 is rotated by an electrical drive unit 22 to thereby adjust the air amount ratio between the warm air from the path 23 through the heater core 20 and the cool air passing through the bypass 21.

Further, a blow-out mode switching unit 15 is arranged in the air-conditioning case 10 downstream of an air mix unit 24. The blow-out mode switching unit 15 includes a defroster opening unit (DEF) 25 with a defroster door 26, a face opening unit (FACE) 27 with a face door 28 and a foot opening unit 29 (FOOT) with a foot door 30. These opening units are operated by the doors 26, 28, 30 driven by an electrical drive unit 31.

The temperature sensor 32 of the evaporator 9 detects the evaporator blow-out temperature Te as an evaporator temperature. The temperature sensor 33 of the cool storage unit 40, on the other hand, detects the cool storage unit blow-out temperature Tc as a cool storage unit temperature.

From the air-conditioning information unit 35, the air-conditioning control device 50 is supplied with various air-conditioning control information including the internal air temperature Tr, the atmospheric air temperature Tam, the sunlight amount Ts, the warm water temperature Tw and the setting temperature designated by the occupant in addition to the evaporator blow-out temperature Te and the cool storage unit blow-out temperature Tc of the temperature sensors 32, 33. Also, from the vehicle information unit 36, the air-conditioning control device 50 is supplied with the various vehicle information including the engine speed, the vehicle speed, the gear shift position of the transmission, the brake pedal angle, the acceleration pedal angle and the driver foot position indicating the acceleration pedal or the brake pedal, whichever receives the foot of the driver. Further, from the external world information unit 37, the air-conditioning control device 50 is supplied with the various information including the images of the road condition in the external (outdoor) world grasped by the on-vehicle camera or the on-vehicle radar for indicating the vehicle motion objectively such as the distance to other vehicles running ahead or behind, the road information obtained by the on-vehicle navigation system or the distance to the next intersection or the road condition ahead. The air-conditioning information unit 35 and the vehicle information unit 36 function as a driver behavior detection unit for detecting the operation amounts of the driver. These units detect the operation amounts of the driver such as the set temperature, the vehicle speed, the foot position, etc. The vehicle information unit 36 also functions as a vehicle motion detection unit for detecting the vehicle motion together with the external world information unit 37. These units detect the vehicle motion information such as the road condition, the road information, etc.

The air-conditioning control device 50 includes one or a plurality of microcomputers each including a CPU, a ROM, a RAM, etc. not shown, peripheral circuits thereof and a storage unit 51 such as an electrically rewritable nonvolatile memory.

The air-conditioning control device 50 includes units for implementing functions through the microcomputer, such as an estimation unit 52, a determining unit 53 and an air-conditioning control unit 54. The estimation unit 52 estimates the behavioral intention of the driver based on the detection information from the information units 35 to 37 and calculates the behavioral intention estimating information for estimating the prospective drive control to be performed by the driver. The determining unit 53 determines storing or releasing the cold thermal energy, and the target evaporator temperature, based on the behavioral intention estimating information and the vehicle motion information calculated. The air-conditioning control unit 54 controls the air-conditioning state in the compartment by driving the air-conditioning device 100 including the compressor 1.

(Configuration of Cool Storage Unit 40)

Next, a specific example of configuration of the cool storage unit 40 is explained with reference to FIG. 2.

The cool storage unit 40 has the shape with the same front area as the evaporator 9 shown in FIG. 1. Also, in order to exhibit the cooling ability adapted to be utilized in air-conditioning mode, the cool storage unit 40 has the configuration of a heat exchanger through which all the cooling air flows after passage through the evaporator 9. This configuration permits the cool storage unit 40 to assume a thin structure having a small thickness in the direction A of flow in the air-conditioning case 10. Also, two heat transfer plates 41, 42 of aluminum are formed with convex surfaces 41a, 42a alternately along the direction A of the cooling air flow. The convex surfaces 41a, 42a are kept in contact and are bonded, by brazing, to each other.

As a result, tubes 45 having hermetic internal spaces 43 are formed inside the convex surfaces 41a, 42a. A cool storage material 44 is stored in the hermetic spaces 43. The cool storage material 44 is formed of paraffin selected as a material having, in this example, a coagulation point of about 8° C. which is included in the variation range (1 to 12° C.) of the evaporator temperature Te.

In view of this, the air path 46 forms a zigzag path by alternate protrusions of convex surfaces 41a, 42a thereby to improve the heat transfer rate from the cooling air to the tubes 45.

Although only two sets of tubes 45 are shown in FIG. 2, a multiplicity of tubes 45 are actually stacked in the direction along arrow B in FIG. 2.

Now, an operation of storing the cold thermal energy according to this embodiment is explained. The climate control apparatus cools the air blown from the blower fan 11 with the evaporator 9. After that, the climate control apparatus mixes the cool air and the warm air with each other by adjusting the opening degree of the air mix door 19 to thereby control the temperature of the air blown into the compartments to the target blow-out temperature TAO. In this case, even in the case where the target blow-out temperature TAO is a comparatively high 12° C., the target evaporator temperature Teo is required to be set to as low a level as possible to complete a operation of storing the cold thermal energy of the cool storage unit 40 within a short period of time.

In view of the fact that the evaporator 9 is frosted at 0° C. or below, however, the lowest temperature (Min) of the target evaporator temperature Teo1 is about 1° C. Also, as the coagulation point of the paraffin making up the cool storage material 44 is 8° C., the rapid cool storage requires a target evaporator temperature Teo1 of, say, 6° C. lower than 8° C. and higher than the lowest temperature to maintain the cold thermal energy after completion of storage. While the cold thermal energy is released, the target evaporator temperature is not required to be set as long as the compressor 1 is off. Once the temperature of the cool storage unit 40 is increased by releasing the cold thermal energy, however, the critical cool storage unit temperature Tco for determining the limit and stop of an operation of releasing the cold thermal energy is required to be set to, say, 12° C.

(Basic Operation of Climate Control Apparatus)

Next, the basic operation of the climate control apparatus by the air-conditioning control device 50 is explained. FIGS. 3A, 3B are flowcharts showing the main routine of the air-conditioning control process (air-conditioning control unit 54) executed in the air-conditioning control device 50.

As shown in FIG. 3A, once the ignition switch, not shown, is turned on and this routine is started, the air-conditioning control device 50 first initializes the contents stored in the data processing memory (RAM) (step 101). Then, the air-conditioning control device 50 reads the various signals (the evaporator temperature Te, the cool storage unit temperature Tc, the internal air temperature Tr, the atmospheric air temperature Tam, the sunlight amount Ts, the warm water temperature Tw, the set temperature Ti designated by the occupant, etc.) from the air-conditioning information unit 35 and also reads an instruction information with respect to the operation of storing or releasing the cold thermal energy from the determining unit described later (step 102).

Then, the air-conditioning control device 50 calculates the required blow-out temperature TAO corresponding to the thermal load of the vehicle based on the various signals (step 103).

Next, the air-conditioning control device 50 selects the air-conditioning mode based on the designated information from the determining unit 53 (step 104). In the case where the normal mode is selected, the air-conditioning control device 50 determines the target evaporator temperature Teo in a normal mode (step 105). This target evaporator temperature Teo is a target value determined by the air-conditioning environmental conditions such as the atmospheric temperature Tam to reduce the power of the engine 4 by reducing the availability factor of the compressor 1. In the case where the atmospheric air temperature is in the range of 18 to 25° C. as in spring or autumn, for example, the target evaporator temperature Teo is set to 12° C. to suppress a wasteful refrigeration cycle operation due to the operation of the compressor 1. In the case where the atmospheric air temperature is lower than 18° C. or higher than 25° C., on the other hand, the target evaporator temperature Teo is set to a low level.

In the case where the cold thermal energy storage mode is selected, on the other hand, the air-conditioning control device 50 determines the target evaporator temperature Teo1 in the cold thermal energy storage mode (step 106). In the case where the cold thermal energy release mode is selected, the air-conditioning control device 50 sets the target evaporator temperatures Teo as a critical cool storage unit temperature Tco (step 107). The temperature Tco indicates that the storage capacity of the cold thermal energy is depleted by the increase in the temperature Tc of the cool storage unit 40. The target evaporator temperatures Teo, Teo1 and the critical cool storage unit temperature Tco are stored in the ROM or the storage unit 51.

As shown in FIG. 3B, the blower control voltage (blow-out air amount) is determined based on the required blow-out temperature TAO calculated at step 103 (step 108). Also, the blow-in mode for switching between the internal and atmospheric air, if not manually set, is determined based on the required blow-out temperature TAO (step 109). Further, the blow-out mode is similarly determined (step 110).

Then, the opening degree of the air mix door 19 is determined in accordance with a control characteristic table predetermined from the required blow-out temperature TAO calculated (step 111). Also, in accordance with conditions such as the cooling load, the on/off state of the compressor 1 is determined (step 112). The air-conditioning control device 50 controls each device in accordance with the processing result of steps 105 to 112 to the desired air-conditioning state (step 113).

(Functions of Estimation Unit 52)

Next, the estimation unit 52 and the determining unit 53 for estimating the behavioral intention of the driver and instructing the air-conditioning control unit 54 to store or release the cold thermal energy are explained with reference to the drawings.

Figure 4B:
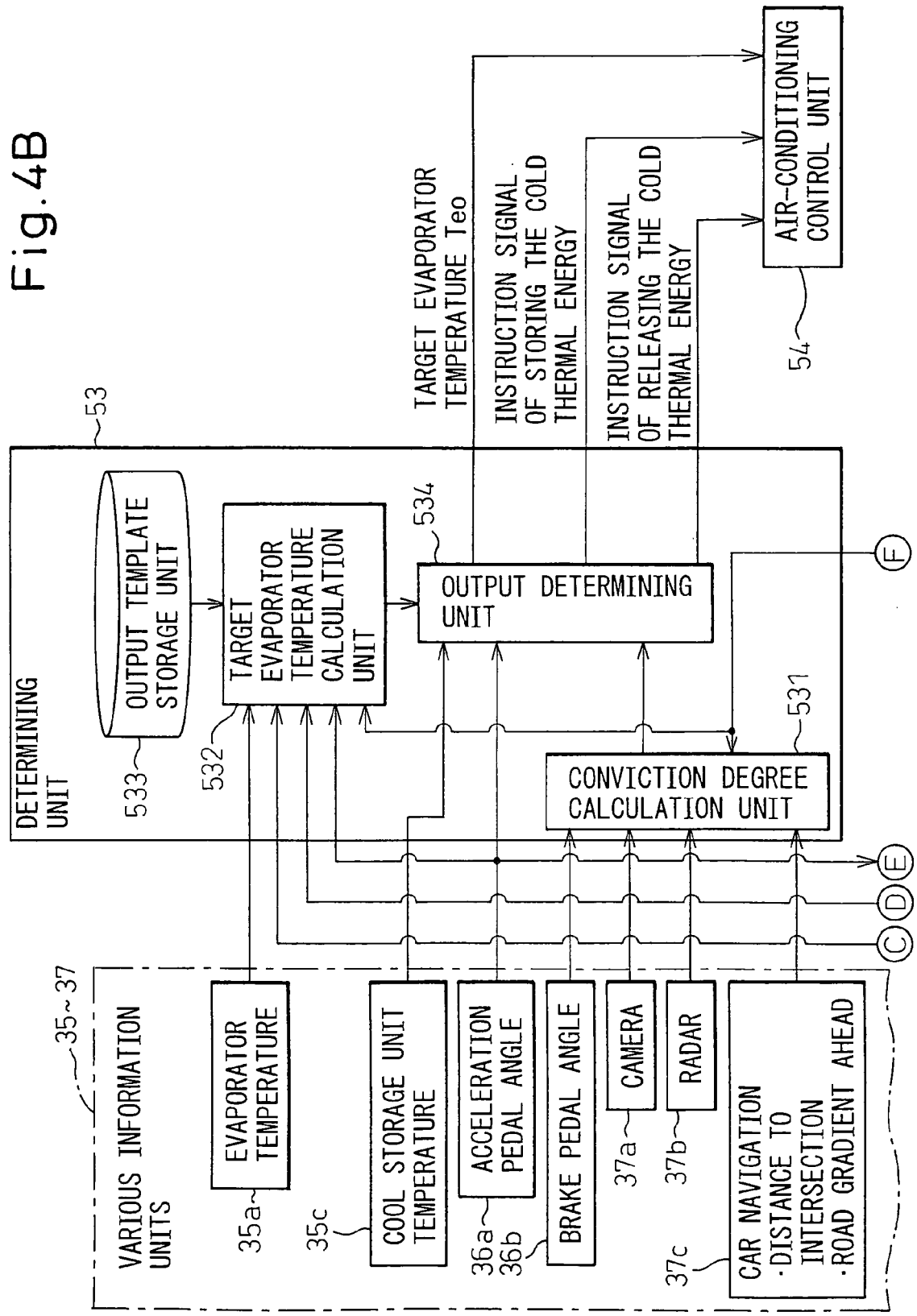
FIG. 4B is a block diagram showing the main functions of a determining unit 53 of the air-conditioning control device 50.

FIGS. 4A, 4B are function block diagrams showing the main functions of the estimation unit 52 and the determining unit 53 of the air-conditioning control device 50.

In FIG. 4A, the estimation unit 52 predicts the prospective driving behavior (braking or acceleration) at an early time point before the driver actually brakes or accelerates the vehicle. The estimation unit 52 includes a normalization unit 521, a driving behavior storage unit 522, a driving pattern storage unit 523 and a similarity degree calculation unit 524. The normalization unit 521 normalizes a plurality of detection information (the operation amounts of the driver) acquired from the air-conditioning information unit 35 and the vehicle information unit 36 functioning as a driver behavior detection unit. The driving behavior storage unit 522 keeps the normalized detection information updated and stored therein for a predetermined period of time based on the normalized detection information. The driving pattern storage pattern unit 523 stores the driving patterns for increasing the braking or engine output. The similarity degree calculation unit 524 compares the latest normalized detection information stored in the driving behavior storage unit 522 with the driving patterns stored in the driving pattern storage unit 523, and calculates the similarity degree. Then, the driving pattern highest in similarity degree is determined and, in accordance with this driving pattern, the subsequent behavioral intention (acceleration or braking) of the driver is estimated.

The detection information (the operation amounts of the driver) used for estimation include the acceleration pedal angle 36a from an acceleration sensor for detecting the acceleration pedal angle, the vehicle speed information 36e from a vehicle speed sensor and the engine speed information 36f from an engine speed sensor. Nevertheless, the operation amounts of the driver are not limited to these items. The air-conditioning information 35b such as the detection information indicating the set temperature T designated by the driver or the cooling load, the foot position information 36c from a foot position detection camera (or a radar) for detecting the acceleration pedal or the braking pedal, whichever receives the foot of the driver, and the gear position information 36d from the gear position sensor for detecting the gear shift position of the transmission are examples of information that can be used as other operation amounts of the driver.

The operation of the estimation unit 52 is explained with reference to FIGS. 5, 6.

The estimation unit 52 reads various detection information as the operation amounts of the driver from the air-conditioning information unit 35 and the vehicle information unit 36 functioning as a driver behavior detection unit (step 201). Next, the normalization unit 521 normalizes each information in accordance with the level and stage thereof. The information thus normalized are digitized into an amount within the range of 0 to 1 as normalized detection information (step 202). Each normalized detection information is stored in the driving behavior storage unit 522 in chronological order as sampling data. Also, the normalized detection information constitute the sampling data for a predetermined latest period of time, say, 5 seconds, and kept updated and stored (step 203). This driving behavior storage unit 522 is configured as a part of the RAM or the storage unit 51 of the air-conditioning control device 50.

The similarity degree calculation unit 524 acquires, at predetermined time intervals of, say, one second, the latest sampling data (latest driving behavior data) stored in the driving behavior storage unit 522. The similarity degree calculation unit 524 compares the acquired sampling data with each driving pattern template stored in the driving pattern storage unit 523. The similarity degree calculation unit 524 thus calculates the degree of similarity based on the degree of coincidence between the compared data. The driving pattern template is described in detail later.

The similarity degree is 1 (unity) in the case where the sampling data completely coincides with any one of the driving pattern templates, and decreases with the increase in the difference with the driving pattern templates. The similarity degree calculation unit 524 detects the driving pattern template highest in similarity degree. The detected driving pattern template is used as the behavioral intention estimation information for predicting the subsequent behavior of the driver. The detected driving pattern template and the similarity degree for the particular template are stored in the storage unit 51 (step 204).

The driving pattern templates stored in advance in the driving pattern storage unit 523 configured as a part of the ROM or the storage unit 51 are explained with reference to FIG. 6.

The driving pattern templates are prepared experimentally in advance. The driving pattern template for the braking operation, for example, is prepared in the manner described below. Specifically, the various detection information (acceleration pedal angle, air-conditioning information, foot position, gear position, vehicle speed and engine speed) for the operation amounts of one hundred drivers are collected. For example, the data for ten seconds immediately before starting the braking operation is detected and normalized. The normalized data (normalized information) are classified by a clustering scheme. Thus, a driving pattern template for the braking operation is determined as a cluster (the set of data of the same type).

Further, each driving pattern template includes a plurality of behavior pattern templates for respective detection information. A behavior pattern template is prepared in the manner described below. First, the average value (data for ten seconds) of the normalized data of various detection information corresponding to a particular driving pattern template is determined. The normalized data for ten seconds is divided into a plurality of five-second data each shifted by one second. Thus, a plurality of behavior pattern templates are prepared.

In a similar fashion, in order to prepare the driving pattern template for the accelerating operation, the various data on the operation amounts of the driver for ten seconds immediately before the start of the accelerating operation are detected and normalized. After that, as in the preceding case, a plurality of driving pattern templates for the accelerating operation are prepared by a clustering scheme.

FIG. 6 shows a case in which the driving pattern templates for the braking operation are classified into clusters of double-depression type, abrupt braking type, etc., respectively, and each cluster for each detection information (acceleration pedal angle, etc.) is divided into a set of six five-second data (behavior pattern templates) each shifted by one second.

The similarity degree calculation unit 524 calculates the similarity degree between a driving pattern template and the measured sampling data in the manner described below, for example. First, the similarity degree calculation unit 524 matches the measured sampling data with each behavior pattern template with respect to each detection information, and determines the highest degree of coincidence with respect to each detection information. The similarity degree calculation unit 524 then multiplies the determined highest degrees of coincidence with each other thereby to calculate the similarity degree.

(Functions of Determining Unit 53)

Next, in FIG. 4B, the determining unit 53, upon receipt of a plurality of detection information (vehicle motion information) acquired from the vehicle information unit 36 and the external world information unit 37 functioning as a vehicle motion detection unit and the similarity degree information from the estimation unit 52, evaluates the reliability of the determined similarity degree using detection information different from those used in the estimation unit 52.

Specifically, the determining unit 53 includes a conviction degree calculation unit 531, a target evaporator temperature calculation unit 532, an output template storage unit 533 and an output determining unit 534. The conviction degree calculation unit 531 calculates the conviction degree indicating the accuracy of the behavioral intention of the driver. Also, the output template storage unit 533 stores the control characteristic values for securing the satisfactory drive feeling and the air-conditioned state at the same time. The target evaporator temperature calculation unit 532 calculates the target evaporator temperature Teo in normal mode or the target evaporator temperature Teo1 in the cold thermal energy storage mode in accordance with the control characteristic value from the output template storage unit 533 based on the similarity degree information, the behavioral intention estimating information, the air-conditioned state, the evaporator temperature Te, the cool storage unit temperature Tc and the engine output state. The output determining unit 534, upon receipt of the various information including the acceleration pedal angle set by the driver, the conviction degree and the target evaporation temperature Teo or Teo1, provides the instruction information (ex. an instruction signal of storing the cold thermal energy or an instruction signal of releasing the cold thermal energy) to the air-conditioning control unit 54 to store or release the cold thermal energy and supplies the target evaporator temperature information Teo or Teo1.

The cool storage unit 53 can store the cold thermal energy in a period immediately before the driver actually brakes the vehicle as well as during the actual braking operation. Therefore, the air-conditioning load (compressor load) on the engine is reduced. As an alternative, the cool storage unit 40 stores the cold thermal energy at a period immediately before the driver actually accelerates the vehicle, and then the cool storage unit 40 releases the cold thermal energy during the actual accelerating operation. Therefore, the air-conditioning load (compressor load) on the engine is reduced.

The detection information (vehicle motion information) that can be used in the determining unit 53 include the road information ahead of the vehicle acquired from the car navigation system 37c guiding the driver along the route, or the video information (road conditions) acquired from the camera 37a or the radar unit 37b mounted on the vehicle for picking up the image ahead, behind or sideways of the vehicle. Nevertheless, these are not the only vehicle motion information that can be used. The brake pedal angle 36b acquired from the brake sensor for detecting the brake pedal angle and the congestion information, the road gradient information and the altitude information acquired from the car navigation system 37c can also be used as the vehicle motion information.

The operation of the units 531, 532, 534 making up the determining unit 53 is explained below.

First, the conviction degree calculation unit 531, as shown in FIG. 7, reads the similarity degree information determined by the similarity degree calculation unit 524 (step 301).

Then, the conviction degree calculation unit 531 determines, for example, the distance from the present vehicle position to the next intersection, the distance from the present vehicle position to the nearest specific object (such as a merging point of free ways) or the gradient of the road ahead of the present vehicle position based on the vehicle motion information acquired from the vehicle information unit 36 and the external world information unit 37 functioning as a vehicle motion detection unit. By totaling the information thus obtained and the behavioral intention estimating information, the conviction degree calculation unit 531 determines, using fuzzy inference, for example, the inference value of the probability that the driver will start a braking behavior or an acceleration behavior in the immediate future.

In the case where the fuzzy inference is used, the conviction degree calculation unit 531 has a predetermined membership function (fuzzy set) for each element constituting the information on the distance to the next intersection, the distance to a specified object or the road gradient. A plurality of membership functions may be set for each element. The membership function for each element is set separately for the acceleration and the braking operations as the driver's behavior.

The conviction degree calculation unit 531, upon acquisition of the behavioral intention estimating information, selects the membership function for each element based on the driver's behavior (acceleration or braking) indicated by the particular information. Next, the conviction degree calculation unit 531 calculates the adaptability (output value of the membership function) of the fuzzy set of each element based on the measurement of each information. After that, the conviction degree calculation unit 531 calculates the center of gravity of the union of the adaptability based on a min-max scheme. The value of the center of gravity thus calculated is the inference value. The conviction degree calculation unit 531 may use the algebraic product-sum-gravity scheme or the simplified inference instead of the min-max scheme.

The inference value can also be determined by other than the fuzzy inference, such as by the function with the aforementioned information as an input variable and the inference value as an output variable. This function can be determined experimentally in advance.

During the accelerating operation, the inference value is higher, the larger the distance to the next intersection or a specified object or when ascending a slope. During the braking operation, on the other hand, the inference value is higher, the shorter the distance to the next intersection or a specified object or when descending a slope.

The conviction degree calculation unit 531 calculates the conviction degree indicating the accuracy of the braking behavior or the acceleration behavior of the vehicle by multiplying the inference value and the similarity degree with each other. As an alternative, the conviction degree calculation unit 531 can use the value of similarity degree directly as the conviction degree in the case where the inference value is not less than a predetermined value (say, 0.5). In view of the fact that the inference value and the similarity degree is expressed by 0 to 1, the conviction degree is also given as a value in the range of 0 to 1. The conviction degree thus calculated is stored in the storage unit 51 (step 303).

As shown in FIG. 8, the target evaporator temperature calculation unit 532 reads the similarity degree information determined by the similarity degree calculation unit 524, the air-conditioning information indicating the air-conditioning load condition, the evaporator temperature Te and the engine speed 36f and the acceleration pedal angle 36a indicating the engine output state (step 401). Upon determination by the target evaporator temperature calculation unit 532 at step 402 that the driver is liable to start a braking behavior based on the behavioral intention estimating information, the process proceeds to step 403.

The output template storage unit 533 includes an output template for improving the drive feeling slightly before or during the braking operation. This output template determines the target evaporator temperature Teo or Teo1 in such a manner as to prevent the abrupt change in the engine output (or the engine load) in accordance with the engine output state determined from the acceleration pedal angle and the engine speed and the present evaporator temperature (correlated with the air-conditioning load or the compressor load) for the gradual or abrupt braking operation.

At step 403, the target evaporator temperature calculation unit 532 reads the output template corresponding to the state immediately before or during the prevailing braking operation. The target evaporator temperature calculation unit 532 calculates the target evaporator temperature Teo1 determined by this output template, and stores it in the storage unit 51. Immediately before the braking operation, i.e. during a short period slightly before the braking operation and the actual gradual braking operation, the target evaporator temperature calculation unit 532 sets the target evaporator temperature Teo at 3 to 8° C. to secure a comparatively low air-conditioning load not giving any feeling of incongruity while storing the cold thermal energy. During the normal braking or abrupt braking, on the other hand, in spite of a higher air-conditioning load as the result of giving priority to storing the cold thermal energy over the drive feeling, the target evaporator temperature calculation unit 532 sets the target evaporator temperature Teo1 at the minimum temperature (Min) of 1° C.

Upon determination by the target evaporator temperature calculation unit 532 at step 402 that that the driver is liable to start the acceleration behavior based on the behavioral intention estimating information, the process proceeds to step 404. In the case where the driving template determined highest in similarity degree is associated with the acceleration behavior, for example, it is determined that the driver is liable to start an acceleration behavior.

The output template storage unit 533 also has an output template for improving the drive feeling immediately before and during acceleration. This output template determines the target evaporator temperature Teo1 in such a manner as to prevent the abrupt change in the engine output (or the engine load) in accordance with the engine output state determined from the acceleration pedal angle and the engine speed and the present evaporator temperature (correlated with the air-conditioning load) Te for the gradual or abrupt braking operation.

At step 404, the target evaporator temperature calculation unit 532 reads the output template corresponding to the state immediately before or during the prevailing acceleration. Further, the target evaporator temperature calculation unit 532 calculates and stores the target evaporator temperature Teo1 determined by this output template. During the period from the time point when the acceleration behavior is predicted to be immediately before acceleration to the time point when the actual acceleration behavior is started, for example, the target evaporator temperature calculation unit 532 sets the target evaporation temperature Teo1 to 3 to 8° C. to store the cold thermal energy. Also, the target evaporator temperature calculation unit 532 sets the target evaporator temperature Teo1 at the maximum temperature of 12° C. or does not set (opens) the target evaporator temperature Teo to stop the refrigeration cycle (mainly the compressor 1) during the actual acceleration behavior such as gradual acceleration, normal acceleration and abrupt acceleration.

Figure 9:
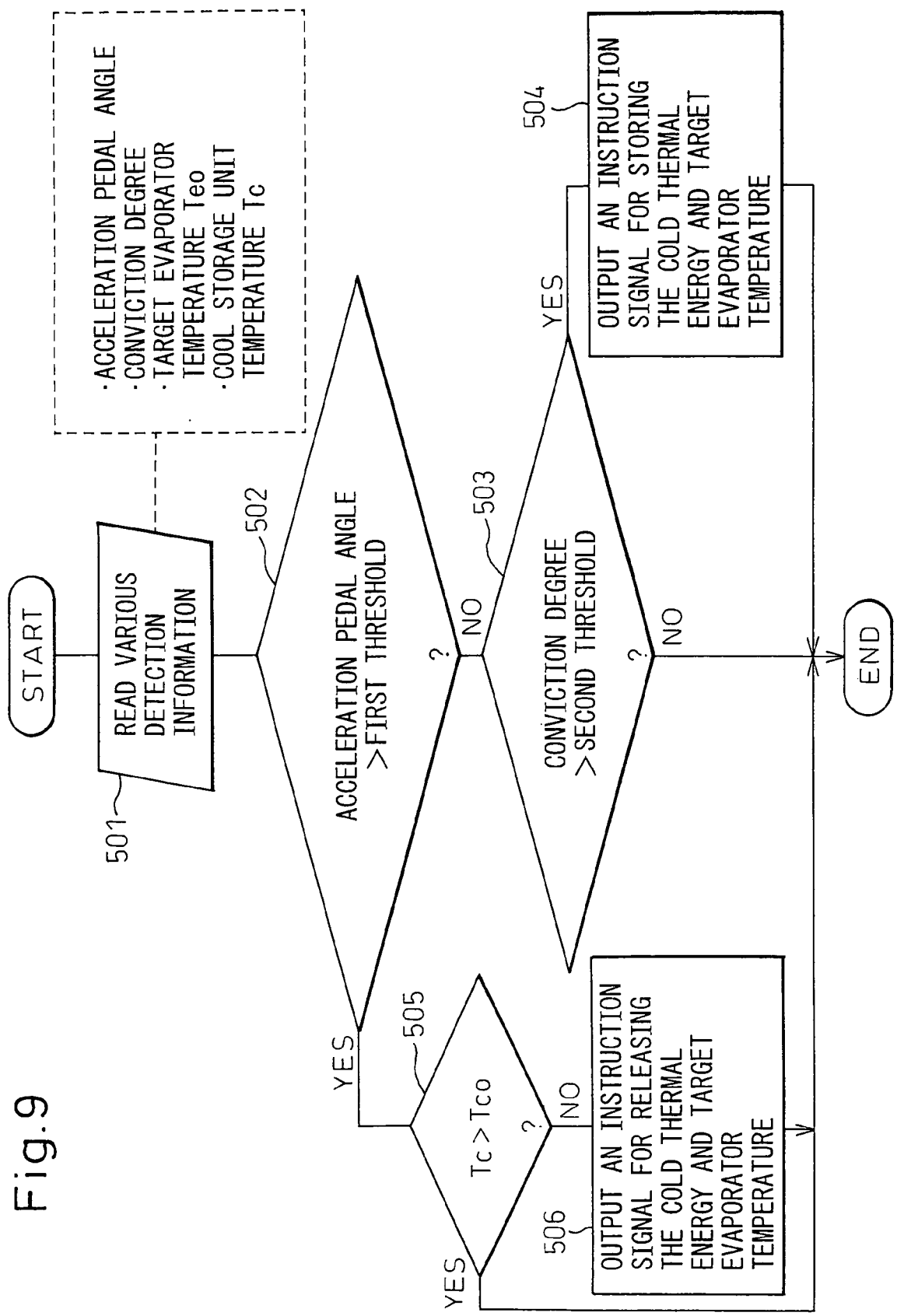
FIG. 9 is a flowchart showing the operation of an output determining unit 534.

As shown in FIG. 9, the output determining unit 534 reads the various detection information (the acceleration pedal angle 36*a*, the conviction degree, the target evaporator temperature Teo or Teo1, and the cool storage unit temperature Tc) (step 501). Upon determination by the output determining unit 534 at step 502 that the acceleration pedal angle is not more than a first threshold value, the process proceeds to step 503. After that, in the case where the conviction degree read from the conviction degree calculation unit 531 is larger than a second threshold value, the output determining unit 534 determines a state in or immediately before the braking operation, and the process proceeds to step 504 thereby to output the instruction signal of storing the cold thermal energy and the target evaporator temperature information Teo1 read previously. Alternatively, at step 504, the output determining unit 534 may set the target evaporator temperature higher than Teo1 and output the target evaporator temperature and the instruction signal of storing the cold thermal energy. Then, the output determining unit 534 may reduce and output the target evaporator temperature in a stepwise fashion until the target evaporator temperature equals Teo1, at the time of actual braking behavior.

At step 503, in the case where the conviction degree that has been read is smaller than the second threshold value, on the other hand, the output determining unit 534 outputs the target evaporator temperature information Teo in normal mode, but does not output the instruction signal for storing or releasing the cold thermal energy. Then, the process is ended.

The first threshold value is determined based on the relation between the acceleration pedal angle and the acceleration feeling. The first threshold value can be set to, for example, 20% of the maximum acceleration pedal angle. Also, the second threshold value can be set to 0.5. In the case where storing the cold thermal energy is given priority, however, the second threshold value can be set to a value lower than 0.5. In the case where the drive feeling is emphasized, on the other hand, the second threshold value can be set to a value higher than 0.5.

Upon determination by the output determining unit 534 at step 502 that the acceleration pedal angle 36*a* is larger than the first threshold value, on the other hand, the process proceeds to step 505. After that, in the case where the cool storage unit temperature Tc is lower than the critical cool storage unit temperature Tco, the output determining unit 534 outputs the instruction signal for releasing the cold thermal energy and the target evaporator temperature information Teo (=Tco, for example, 12° C.) read earlier (step 506). Also, in the case where the cool storage unit temperature Tc is higher than the critical cool storage unit temperature Tco at step 505, the process is ended as it is.

FIGS. 10A to 10D are diagrams for explaining an example of the operation of the estimation unit 52 and the determining unit 53.

Figure 10A:
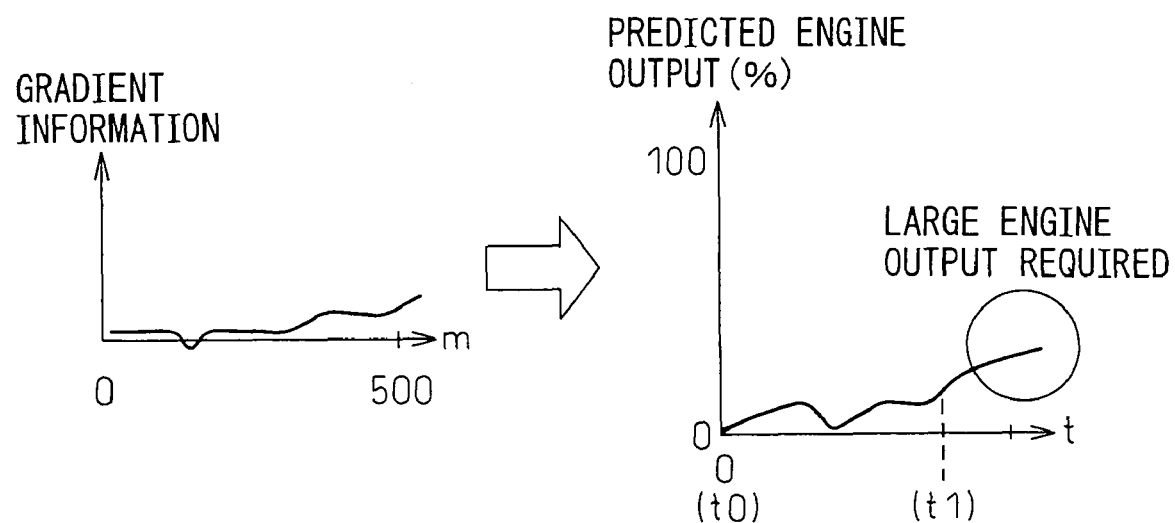
FIG. 10A is a diagram for explaining an example of operation of the estimation unit 52 and the determining unit 53.

FIG. 10A shows the engine output changing with the road gradient or, especially, the requirement of a large engine output when ascending a steep slope on the assumption that the driver drives along a road while maintaining the current speed from the present time point t0. The engine output is estimated based on, for example, the road gradient information received by the car navigation system.

Figure 10B:
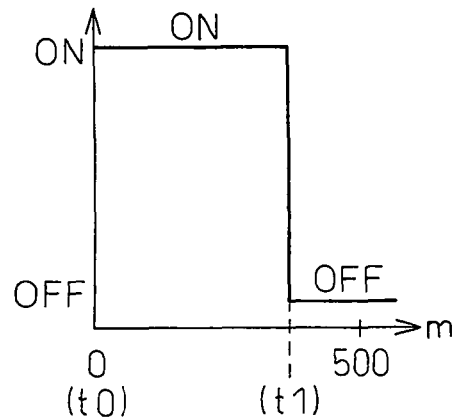
FIG. 10B is a diagram for explaining an example of operation of the estimation unit 52 and the determining unit 53.
Figure 10C:
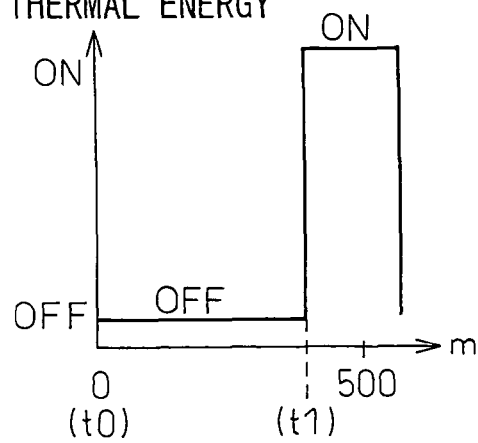
FIG. 10C is a diagram for explaining an example of an operation of the estimation unit 52 and the determining unit 53.
Figure 10D:
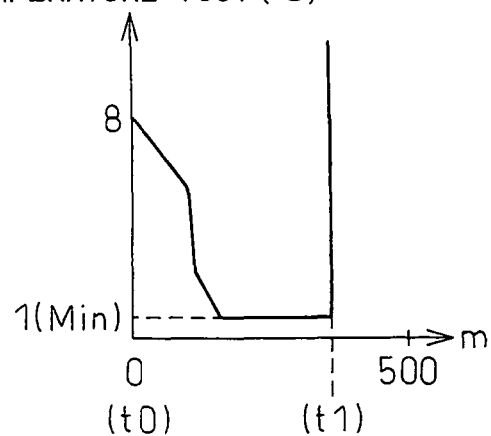
FIG. 10D is a diagram for explaining an example of an operation of the estimation unit 52 and the determining unit 53.

FIGS. 10B to 10D show that the cold thermal energy is slightly stored by the cool storage unit 40 during the period of t0 to t1 before time point t1 when a large engine output is required by the cool storage unit 40 on a steep slope, and that the cold thermal energy is released from time point t1.

In view of this, the determining unit 53 outputs an instruction signal for storing the cold thermal energy during the period from the present time point t0 to time point t1 (FIG. 10B). Also, the determining unit 53 outputs a instruction signal for releasing the cold thermal energy during the period from time point t1 till the temperature of the cool storage unit 40 reaches the critical cool storage unit temperature Tco (FIG. 10C). Also, in response to the instruction signal of storing the cold thermal energy from the present time point t0, the determining unit 53 reduces the target evaporator temperature Teo1 gradually to lower than 8° C. where the cold thermal energy can be stored and sets the temperature Teo1 to the minimum temperature (Min) of 1° C. in accordance with the engine output state and the air-conditioning state to secure both the satisfactory drive feeling and in-compartment comfort.

As described above, according to this embodiment, the vehicle climate control apparatus controls the vehicle climate using the target evaporator temperature Teo determined by the air-conditioning environment conditions in the normal mode shown in FIGS. 3A, 3B. Specifically, in the intermediate temperature range (for example, 18 to 25° C.) of the atmospheric temperature Tam, the requirement of cooling and dehumidification is reduced, and therefore the power of the engine 4 can be saved by increasing the target evaporator temperature Teo (to, say, 12° C.) while at the same time reducing the availability factor of the compressor 1.

In the cold thermal energy storage mode shown in FIGS. 3A, 3B, the vehicle climate control apparatus sets the target evaporator temperature Teo at Teo1 (say, 1 to 8° C.) required for the cool storage unit 40 to store the cold thermal energy. According to this embodiment, the vehicle climate control apparatus, as shown in FIGS. 8, 9, sets the cold thermal energy storage mode from the time point when the braking behavior is predicted as well as during the actual vehicle braking operation. Further, the vehicle climate control apparatus, when the engine output is increased such as when the acceleration behavior or the behavior of ascending a slope is predicted, also sets the cold thermal energy storage mode for storing the cold thermal energy to such an extent as not to give a feeling of incongruity to the driver during the period from the time point when an output increase is predicted to the time point when the output increase operation is performed. By so setting, the duration of the cold thermal energy storage mode can be set longer than the actual braking time, thereby making it possible to store a greater amount of the cold thermal energy.

Also, during the cold thermal energy release mode such as an idling stop as shown in FIGS. 3A, 3B, the air-conditioning state can be maintained for a comparatively long time using the capacity of the cold thermal energy of the cool storage unit 40 even in the case where the compressor 1 is stopped before the cool storage unit temperature Tc of the cool storage unit 40 reaches the critical cool storage unit temperature Tco. Also, the cold thermal energy release mode is introduced at the time of acceleration or ascending a slope or, in the broad sense of the word, when the engine output increases. In such a case, the required air-conditioning means can be provided without hampering the drive feeling in acceleration, or ascending a slope, by stopping the compressor 1 (refrigeration cycle).

Also, according to this embodiment, as shown in FIGS. 8, 9, the use of the similarity degree of the driving patterns by the estimation unit 52 and the conviction degree of the braking or acceleration behavior by the determining unit 53 makes it possible to predict the braking behavior or the acceleration behavior of the driver in the immediate future with a higher probability at a time earlier than the actual braking or acceleration behavior of the driver. As a result, a long cool storage time can be more positively secured.

Further, in the vehicle climate control apparatus according to this embodiment, as shown in FIG. 8, the target evaporator temperature Teo1 is set in accordance with the engine output state when starting the cold thermal energy storage mode based on the output template set and stored in the output template storage unit 533 in advance. Even in the case where the cold thermal energy storage mode is started at the time of predicting the braking behavior in the immediate future or during the actual braking operation or at the time of predicting the acceleration behavior in the immediate future, therefore, the engine output can be prevented from being suddenly changed.

OTHER EMBODIMENTS

The embodiment described above represents an application of the invention to a vehicle climate control apparatus for controlling the air-conditioning device 100 having the cool storage unit 40. However, this invention is not limited to the configuration for storing or releasing the cold thermal energy in or from the cool storage unit 40. According to the invention, the intention of the driver for a driving behavior (such as acceleration or braking) is estimated, and the output state of the power source of the vehicle is predicted at an early time, so that the air-conditioning control unit is instructed to adjust the air-conditioning capacity in accordance with the output state, thereby securing both the satisfactory driving feeling and the in-compartment comfort at the same time.

Even in the case where the engine load is increased, such as at a merging point of freeways, for example, the compressor load of the climate control apparatus may be reduced temporarily by estimating the intention for the driving behavior at an early time. This invention is applicable also to a vehicle having a motor as a power source such as a hybrid car or an electric car in which the engine and the motor are combined. In the case where the load condition of the power source is increased, for example, the intention of the driver for the driving behavior is estimated and the output state of the power source of the vehicle is predicted at an early time. By adjusting the operating condition (air-conditioning capacity) of the electric compressor of the climate control apparatus in accordance with the predicted output state, the effect of the electric compressor (electrical load) on the on-vehicle power supply is reduced. As a result, the source voltage drop due to an overload of the power supply and the deterioration of the drive feeling can be prevented.

Also, in this embodiment, the driving behavior of the driver is divided into the braking behavior and the acceleration behavior. In the broad sense of the words, the acceleration behavior according to this embodiment is defined as a driving behavior for increasing the engine output including the acceleration behavior and the behavior of ascending a slope.

Further, according to this embodiment, as shown in FIGS. 5, 6, the driving pattern storage unit 523 of the estimation unit 52 is configured to store the driving pattern template for each of various detection information experimentally determined in advance. The driving pattern template storage unit 523 has, stored and set therein, a reference driving pattern template shared by a multiplicity of drivers. In view of the individual differences of propensity and features between individual drivers, however, the propensity and the features of the individual drivers are preferably learned from the actual driving pattern and reflected in the driving pattern template. By doing so, the individual adaptability is further improved for an improved determining accuracy of the driving pattern.

For the reason described above, the embodiment shown in FIG. 11 further includes the process for detecting the actual driving pattern (driving behavior data) in the control flow of FIG. 5 and the process for correcting the driving pattern template in the driving pattern template storage unit 523 (steps 205, 206) as a learning process.

First, step 205 for determining the learning conditions, i.e. as to whether the learning process is to be executed or not. According to this embodiment, the driving pattern determination accuracy is improved by retrieving the various detection information in the case where the similarity degree is high. Upon determination by the estimation unit 52 that the similarity degree calculated at step 204 is associated with the braking behavior or the acceleration behavior higher than a predetermined value, the process proceeds to step 206, and the sampling data (driving behavior data) for each of the prevailing various detection information is retrieved and stored temporarily in the RAM or the storage unit 51.

Then, at step 206, the estimation unit 52 determines an averaged braking behavior pattern or an averaged acceleration behavior pattern each time the braking behavior data or the acceleration behavior data are accumulated a predetermined number of times. Using the braking behavior pattern or the acceleration behavior pattern thus determined, the estimation unit 52 corrects each template of the braking behavior pattern and the acceleration behavior pattern stored in the driving pattern template storage unit 523 thereby to reflect a driving pattern unique to each driver. To stabilize the determination accuracy, however, each template is preferably corrected by employing, for example, the weighted average to gradually correct the data amount of each template initially set and stored.

In the case where step 205 determines that the similarity degree is lower than the predetermined value, on the other hand, the process is terminated without the learning process.

The invention claimed is:

1. A vehicle climate control apparatus, mounted on a vehicle driven by an engine or a motor as a power source to control the climate in the compartment of the vehicle, the apparatus controlling an air-conditioning device having a cool storage unit for storing the cold thermal energy using the cooling capacity during the air-conditioning operation, the apparatus comprising:
   an air-conditioning control unit for controlling the air-conditioning state in the vehicle compartment by controlling the air-conditioning device;
   a driving behavior detection unit for detecting the operation amounts of the driver;
   an estimation unit for calculating the behavioral intention estimating information for estimating the prospective driving behavior of the driver based on the operation amounts detected;
   a vehicle motion detection unit for detecting the motion of the vehicle; and
   a determining unit for determining the conviction degree indicating the accuracy of the behavioral intention estimating information based on the vehicle motion information detected by the vehicle motion detection unit and instructing the air-conditioning control unit to store the cold thermal energy in the cool storage unit based on the conviction degree.

2. A vehicle climate control apparatus according to clam 1, wherein the determining unit instructs the air-conditioning control unit to store the cold thermal energy in the cool storage unit in the case where the conviction degree exceeds a predetermined value and does not instruct the air-conditioning control unit to store the cold thermal energy in the cool storage unit in the case where the conviction degree is not more than the predetermined value.

3. A vehicle climate control apparatus according to claim 1, wherein the vehicle motion information includes at least a selected one of the road information from the car navigation system for guiding the driver along the route and the road condition ahead of or behind the vehicle detected by a camera or a radar.

4. A vehicle climate control apparatus according to clam 1, wherein the air-conditioning device has an evaporator, and the determining unit instructs the cool storage unit to store the cold thermal energy so as to achieve a target evaporator temperature.

5. A vehicle climate control apparatus according to claim 1, wherein the estimation unit includes a driving behavior storage unit for storing the operation amounts for a predetermined period of time, a driving pattern storage unit for storing a predetermined driving behavior pattern indicating the accelerating behavior or the braking behavior, and a similarity degree calculation unit for determining the similarity by comparison between the operation amounts stored in the driving behavior storage unit and the predetermined driving behavior pattern and calculating the behavioral intention estimating information based on the driving pattern highest in similarity degree,
wherein the determining unit determines the conviction degree based on the vehicle motion information, the behavioral intention estimating information and the similarity degree.

6. A vehicle climate control apparatus according to claim 1, wherein the air-conditioning device includes an air-conditioning case, an evaporator arranged in the air-conditioning case for cooling the flowing air and the cool storage unit downstream of the evaporator, and
wherein the determining unit further includes a target evaporator temperature calculation unit for determining the target evaporator temperature based on the vehicle motion information, the behavioral intention estimating information and the conviction degree, and an output determining unit for instructing the air-conditioning control unit to store the cold thermal energy in the cool storage unit so as to achieve the target temperature of the evaporator in the air-conditioning device.

7. A vehicle climate control apparatus according to claim 6, wherein the behavioral intention estimating information predicts the braking behavior of the driver and, in the case where the conviction degree exceeds a predetermined value, the output determining unit reduces the target evaporator temperature stepwise from a level higher than a temperature determined by the target evaporator temperature calculation unit, and at the time of actual braking behavior, sets the target evaporator temperature to the temperature determined by the target evaporator temperature calculation unit.

8. A vehicle climate control apparatus according to claim 1, wherein the behavioral intention estimating information predicts the acceleration behavior of the driver, and in the case where the conviction degree exceeds a predetermined value, the determining unit desirably instructs the air-conditioning control unit to store the cold thermal energy in the cool storage unit until the driver actually performs the accelerating behavior from the time of estimation of the driving behavior.

9. A vehicle climate control apparatus according to claim 8, wherein, in the case where the driver actually conducts the acceleration behavior, the determining unit instructs the air-conditioning control unit to release the cold thermal energy from the cool storage unit.

* * * * *